United States Patent [19]
Yamamoto et al.

[11] Patent Number: 6,033,341
[45] Date of Patent: Mar. 7, 2000

[54] CLUTCH CONNECTION/DISCONNECTION APPARATUS

[75] Inventors: Yasushi Yamamoto; Masaki Ishihara; Nobuyuki Iwao; Masaaki Nishito, all of Fujisawa, Japan

[73] Assignee: Isuzu Motors Limited, Tokyo, Japan

[21] Appl. No.: 09/150,686

[22] Filed: Sep. 10, 1998

[30] Foreign Application Priority Data

Sep. 12, 1997 [JP] Japan .................................. 9-248862

[51] Int. Cl.$^7$ ................................................. B60K 41/28
[52] U.S. Cl. ............................................ 477/181; 477/85
[58] Field of Search .................................. 477/84, 85, 181

[56] References Cited

U.S. PATENT DOCUMENTS

| | | | |
|---|---|---|---|
| 4,711,141 | 12/1987 | Speranza | 477/85 |
| 4,766,544 | 8/1988 | Kurihara et al. | 477/85 |
| 4,873,637 | 10/1989 | Brau | 477/85 |
| 5,378,211 | 1/1995 | Slicker et al. | 477/181 |
| 5,529,548 | 6/1996 | Mack | 477/84 |

*Primary Examiner*—Dirk Wright
*Attorney, Agent, or Firm*—Rader, Fishman & Grauer PLLC

[57] ABSTRACT

A clutch connection/disconnection system which causes a friction clutch to slip appropriately when the clutch is automatically disconnected and connected. An engine is controlled according an accelerate command signal. During automatic clutch connection, the accelerate command signal approaches an actual accelerator pedal position signal. An approaching speed of the accelerate command signal is stepwise changed based on comparison between a particular value and a threshold value. The "particular value" is a differential value of a difference between an engine rotational speed and clutch rotational speed. When the clutch is slipping, the engine rotational speed is controlled to rise gently so that overslipping of the clutch is prevented.

12 Claims, 7 Drawing Sheets

| | NORMAL | SUDDEN DISCONNECTION | LOW SPEED CONNECTION | MID SPEED CONNECTION | HIGH SPEED CONNECTION |
|---|---|---|---|---|---|
| 3-WAY VALVE 78 | OFF | ON | ON | OFF | OFF |
| 3-WAY VALVE 79 | OFF | ON | OFF | OFF | ON |
| 3-WAY VALVE 80 | OFF | ON | OFF | OFF | OFF |

FIG. 5A
FIG. 5B
FIG. 5C
FIG. 5D

CLUTCH CONNECTION/DISCONNECTION APPARATUS

BACKGROUND OF THE INVENTION

1. Field of the Invention

The present invention relates to an apparatus for connecting and disconnecting a clutch, and more particularly to such a connection/disconnection apparatus which can automatize operations of a vehicle's clutch.

2. Description of the Related Art

Recently in an automobile industry, there is known an automatic speed change (or transmission) system which includes a clutch disconnection/connection unit for automatically disconnecting and connecting a friction clutch, an automatic transmission unit associated with a manual transmission for automatically changing a shift position of the manual transmission, and an engine control unit for regulating an engine. This automatic speed change system executes clutch disconnection/connection control, speed change (shift position change) control and engine control when a vehicle driver wants to change a shift position.

In general, the automatic speed change system controls the clutch and engine such that the friction clutch slips as small as possible during clutch connection when the driver shifts the shift lever. On the other hand, if a vehicle is not equipped with the automatic speed change system (or in the case of common manual operation vehicle), a driver stamps down an acceleration pedal while maintaining a clutch pedal in a half connected position during clutch connection, so that the friction clutch slips to a certain extent while the engine is accelerated until the clutch connection and shift position change are completed. Therefore, when a vehicle equipped with the conventional automatic speed change system is compared with a common manual operation vehicle, the driver of the vehicle equipped with the automatic speed change system feels somehow strange in the clutch half connected condition when the driver intends to speed up the vehicle. This is because the clutch connection proceeds slowly and the driver feels tardiness during engine speed acceleration.

In order to eliminate this drawback, the clutch connection control to the automatic speed change system should be performed such that the clutch is allowed to slip to a certain extent in the half connected condition. However, this control may admit overslippage. A measure to prevent overslipping of the friction clutch is then required.

Japanese Utility Model Application, Kokai No. 61-69550 discloses a technique that regulates an engine speed to be close to a clutch disc rotating speed before clutch connection is carried out. The clutch connection is performed when the rotational speed difference between the engine and clutch is reduced to a particular range. This softens a shock caused upon clutch connection.

SUMMARY OF THE INVENTION

One object of the present invention is to provide a clutch connection/disconnection apparatus which allows a clutch to slip to a certain extent during automatic clutch connection but prevents overslipping of the clutch, thereby improving driver's comfortableness.

Another object of the present invention is to provide a clutch connection/disconnection apparatus which restrains an engine revolution speed from rising while the clutch is slipping.

Still another object of the invention is to provide a clutch connection/disconnection apparatus which smoothly carries out automatic clutch connection after automatic shift change.

According to one aspect of the present invention, there is provided a clutch connection/disconnection apparatus comprising automatic clutch disconnection and connection means for automatically disconnecting and connecting a clutch upon receiving a predetermined signal, and an engine control means for controlling an engine based on an accelerate command signal (pseudo accelerator pedal position signal) regardless of an actual position of the accelerator pedal (or signal indicating the actual accelerator pedal position) when the clutch is automatically disconnected and connected. The accelerate command signal is controlled to approach the actual accelerator pedal position signal during automatic clutch connection. In this engine control or accelerate command signal control, the approaching speed of the accelerate command signal to the actual accelerator pedal position signal is stepwise varied based on comparison between two values; one value is obtained by differentiating a rotational speed difference between an engine revolution speed and a clutch disc rotating speed and another value is a predetermined threshold value. The deepest stamping down of the accelerator pedal corresponds "full throttling" of an accelerator. Complete closing of the accelerator corresponds to no stamping down of the accelerator pedal.

Result of differentiation (differential value) of the rotational speed difference between the engine rotational speed and clutch rotational speed indicates a chronological change of the rotational speed difference. Based on this chronological change, clutch slippage is indirectly determined. The engine is controlled according to this clutch slippage. Unless the above-mentioned rotational speed difference gradually increases or decreases while the clutch connection is being carried out, it is determined that the clutch is slipping excessively. Then, the above-mentioned approaching speed is caused to drop. Rising of the engine rotational speed is therefore restrained during clutch slippage. Accordingly slipping of the clutch is restrained.

The above-mentioned threshold value may include a first threshold value and a second threshold value greater than the first threshold value. If the differential value is not greater than the first threshold value, the engine control means may set the "approaching speed" to a first speed. If the differential value is greater than the first threshold value but not greater than the second threshold value, then the engine control means may set the "approaching speed" to a second speed slower than the first speed. If the differential value is larger than the second threshold value, the "approaching speed" may be set to a third speed slower than the second speed.

The second speed may be obtained by maintaining a difference between the actual accelerator pedal position signal and accelerate command signal to a constant value, and the third speed may be obtained by maintaining the accelerate command signal to a constant value.

The engine control means may not compare the differential value with the threshold value(s) and fix the above-mentioned "approaching speed" to a particular value when the engine rotational speed is smaller than the clutch rotational speed during automatic clutch connection. The engine control means may change the "approaching speed" in a clutch half connected condition of the automatic clutch connecting operation.

The automatic clutch disconnection/connection means may be able to switch a clutch connection speed. It may also store a third threshold value greater than the second threshold value. If the differential value is larger than the third threshold value, the automatic clutch disconnection/connection means may raise the clutch connection speed (or switch the clutch connection speed to a higher value). The automatic clutch disconnection/connection means may switch the clutch connection speed in a clutch half connected condition of the automatic clutch connecting operation.

If the engine is a diesel engine, the engine control means may control an electronic governor of the diesel engine.

The engine control means may use the actual accelerator pedal position signal as the accelerate command signal when the automatic clutch disconnection and connection is not performed.

The engine control means may decrease the accelerate command signal when the clutch is automatically disconnected, and increase the accelerate command signal when the clutch is subsequentially connected.

The above-mentioned "rotational speed difference" may be obtained by subtracting the clutch rotational speed from the engine rotational speed. The differential value may be obtained by subtracting a rotational speed difference of a particular period ago from a current rotational speed difference.

The clutch connection/disconnection apparatus of the invention may be utilized with an automatic transmission that includes a manual transmission and actuator for shifting the manual transmission.

The signal that causes the automatic clutch disconnection and connection means to automatically disconnect the clutch may be a shifting signal (shift start signal) generated based on a driver's shifting operation using a shift lever, and the automatic disconnection and connection means may start disconnecting the clutch upon receiving this shifting signal.

The signal that causes the automatic clutch disconnection and connection means to automatically connect the clutch may be a shift completion signal indicative of ending of shifting sent from the transmission, and the automatic clutch disconnection and connection means may start the clutch connection upon receiving the shift completion signal.

The automatic clutch disconnection and connection means may include a booster or assistor adapted to receive and discharge an air (air pressure) for connecting and disconnecting the clutch, a three-way electromagnetic valve for switching between the air reception and air discharge of the booster, and a controller for controlling the three-way electromagnetic valve.

A plurality of three-way electromagnetic valves may be provided, and a plurality of different throttles (chokes or restrictions) may be provided at outlets of the electromagnetic valves respectively. The controller may regulate the electromagnetic valves so that an air pressure discharging speed of the booster is stepwise adjustable and the clutch connection speed is also stepwise adjustable.

The clutch connection and disconnection apparatus of the invention may further include a manual disconnection/connection means for allowing the driver to disconnect and connect the clutch by stamping down and releasing a clutch pedal. The manual disconnection/connection means may include a booster for receiving and discharging an air (air pressure) to connect and disconnect the clutch, a hydraulic valve for switching between air reception and air discharge of the booster and a master cylinder for producing a hydraulic pressure according to a position of the clutch pedal to actuate the hydraulic valve. The master cylinder and hydraulic valve may be communicated with each other by a hydraulic pressure passage that expands and reduces upon activation of the booster. An air pressure is applied to the master cylinder upon automatic disconnection and connection of the clutch so that the master cylinder produces a hydraulic pressure. Another three-way electromagnetic valve may be provided for switching between air pressure application to the master cylinder and air pressure discharge from the master cylinder, and the controller may regulate this three-way electromagnetic valve. It is preferred that air pressure discharged from the three-way electromagnetic valve is combined with air pressure discharged from the booster when the clutch is automatically connected.

According to another aspect of the present invention, there is provided a clutch connection and disconnection apparatus comprising an automatic disconnection/connection means for carrying out automatic disconnection and connection of a clutch based on a predetermined signal, and a control means for selecting a control mode in which an accelerate command signal is determined regardless of an actual accelerator pedal position signal and an engine is controlled according to the accelerate command signal when the clutch is automatically disconnected and connected. In this control mode, the difference between the engine rotational speed and clutch rotational speed is differentiated and the resulting value is compared with a predetermined threshold value. According to this comparison, the control means controls the accelerate command signal to increase more (faster) than the increasing actual accelerator pedal position signal, to increase less (slower) than the increasing actual accelerator pedal position signal or to remain at a constant value. There is another control mode in which a signal indicative of the actual accelerator pedal position is used as the accelerate command signal and the engine is controlled according to this accelerate command signal, i.e., the actual accelerator pedal position.

DETAILED DESCRIPTION OF THE INVENTION

Now, an embodiment of the present invention will be described in reference to the accompanying drawings.

Figure 1:
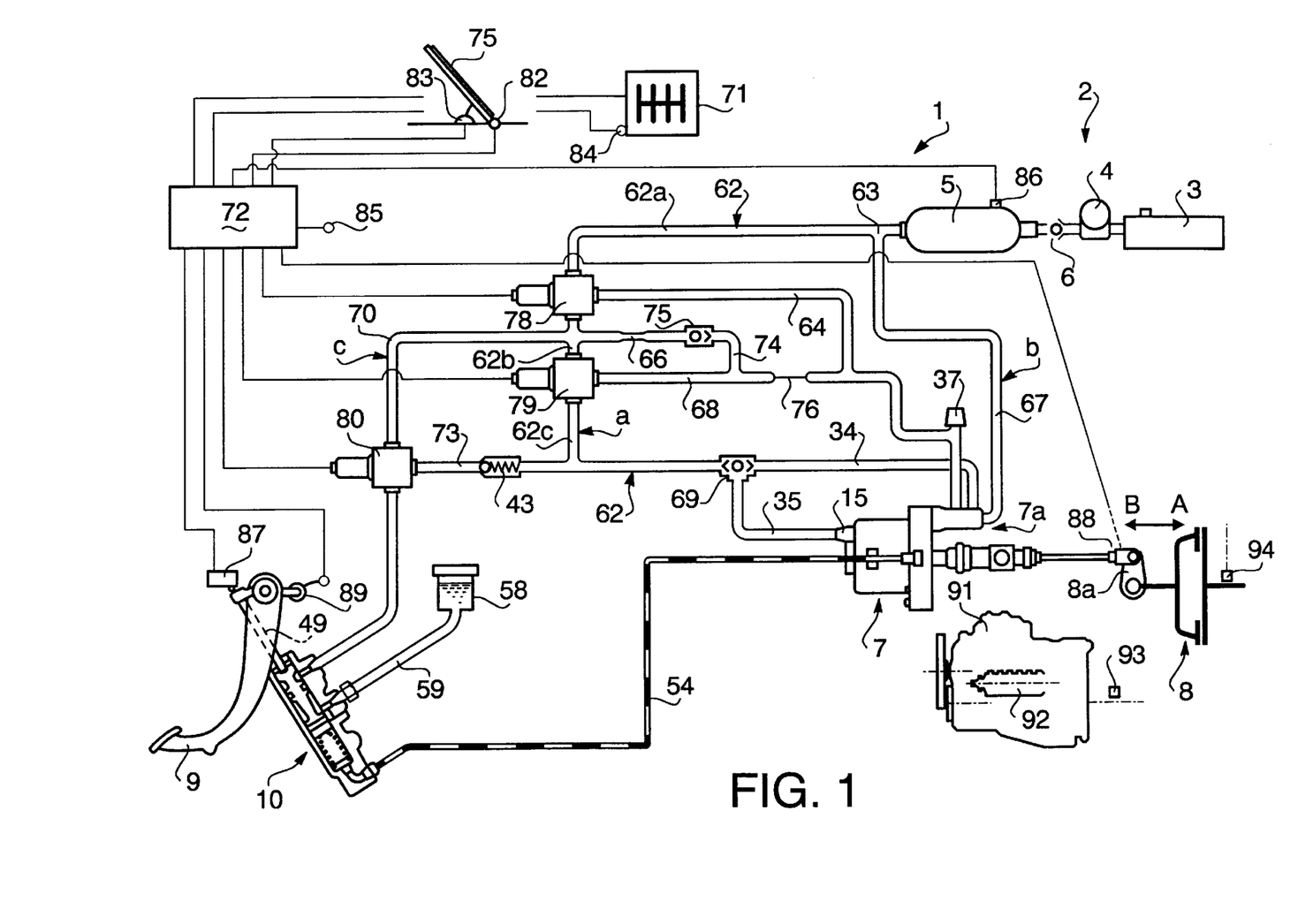
FIG. 1 illustrates an overall view of a clutch connection and disconnection apparatus according to the present invention.

Referring to FIG. 1, illustrated is a clutch connection and disconnection apparatus 1 according to the invention, which employs a so-called semi-automatic clutch system enabling manual disconnection and connection of a clutch as well as automatic disconnection and connection. As shown, the clutch connection and disconnection apparatus 1 includes an air pressure feeding means 2. The air pressure feeding means 2 includes a compressor 3 driven by an engine 91 for generating an air pressure, an air dryer 4 for drying an air supplied from the compressor 3, an air tank 5 for storing an air supplied from the air dryer 4, and an check valve 6 provided at an inlet of the air tank 5. The air pressure from the air pressure feeding means 2 is introduced into an assistor (clutch booster) 7, and the clutch booster 7 causes a friction clutch 8 to move in a disconnecting direction A (right in the drawing) upon receiving the air pressure. A hydraulic pressure is also introduced to the booster 7 from a master cylinder 10 (will be described later).

Figure 2:
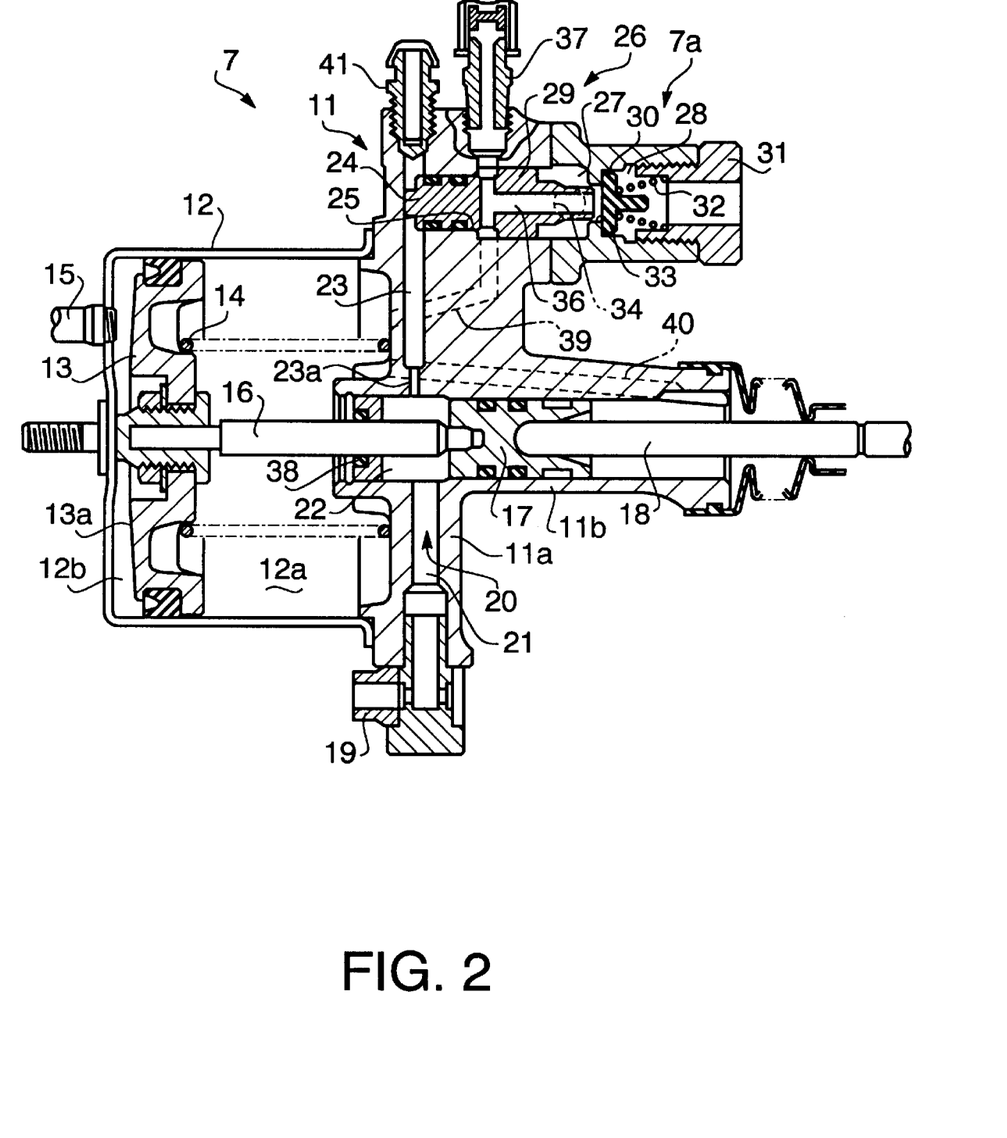
FIG. 2 illustrates an enlarged cross sectional view of a booster shown in FIG. 1.

Referring to FIG. 2, depicted is a detail of the booster 7 in elevational cross section. The booster 7 is a common booster. This booster 7 has a main body 11 and a cylinder shell 12 attached to the main body 11. A piston plate (power piston or booster piston) 13 is located in the cylinder shell 12 and biased toward an air pressure introducing direction (left in the drawing) by a return spring 14. An air pressure nipple 15 is mounted on one end of the cylinder shell 12. This nipple 15 serves as an air pressure inlet which introduces an air pressure from the air tank 5 through an air pressure pipe 35 (FIG. 1). As the air pressure is introduced, the piston plate 13 is forced to the right in the drawing. Then, the piston plate 13 pushes a piston rod 16, a hydraulic piston 17 and a push rod 18 in turn, thereby forcing a clutch lever 8a (FIG. 1) toward the disconnecting direction A. As a result, the clutch 8 is disconnected.

A hydraulic passageway 20 is formed in the booster body 11. A hydraulic pressure inlet of the passageway 20 is defined by a hydraulic nipple 19. A hydraulic pressure pipe 54 (FIG. 1) extends from the master cylinder 10 (FIG. 1) to the nipple 19. The hydraulic passageway 20 is generally comprised of a bore 21 formed in a lower portion of a body flange 11a, a hydraulic cylinder 22 formed in a body cylinder portion 11b for receiving the hydraulic piston 17, and a control bore 23 formed in an upper portion of the body flange 11a and communicated with the hydraulic cylinder 22 via a small bore 23a. When a hydraulic pressure is introduced from the nipple 19, it reaches the control bore 23 through the lower bore 21 and cylinder 22, thereby moving a control piston 24 to the right in a control cylinder 25. This is a control valve unit (hydraulically driven valve) 7a provided in the upper area of the body flange 11a for controlling an amount of air pressure to be fed to the booster 7 (will be described later)

The control valve unit 7a is a main unit of a control body portion 26 extending in the right direction. The control body portion 26 includes a control chamber 27 and air pressure port 28 coaxially communicated with the control cylinder 25. In the control chamber 27, received is a slidable control element 29 for the control piston 24. In the air pressure port 28, received is a slidable poppet valve 30. A nipple 31 is mounted at the air pressure port 28, and an air pressure pipe 67 (FIG. 1) connects to the nipple 31 to always supply an air pressure.

The poppet valve 30 is normally biased to the left by the air pressure and spring force of a poppet spring 32 so as to close a connection port 33 between the control chamber 27 and air pressure port 28. Therefore, the air pressure from the nipple 31 is interrupted at the poppet valve 30. However, when a hydraulic pressure is supplied from the oil pressure pipe 54, the control element 29 of the control piston 24 causes the poppet valve 30 to move to the right thereby opening the connection port 33. Then, the air pressure enters the control chamber 27 from the connection port 33 and further flows into an air pressure inlet chamber 12b of the cylinder shell 12 through air pipes 34 and 35 (FIG. 1) (will be described later). The air pipe 34 extends from the control chamber 27 to the air pipe 35, and the air pipe 35 extends to the nipple 15. The air pressure in the cylinder shell 12 acts on a left surface 13a of the piston plate 13 thereby moving the piston plate 13 to the right. The clutch 8 is therefore operated to the disconnection direction.

The booster 7 causes the clutch 8 to move a certain stroke according to the oil pressure supplied to the booster. Specifically, when the hydraulic pressure is raised a relatively small amount, the piston plate 13 is moved to the right by the air pressure (as already described above). As a result, the hydraulic piston 17 is forced to the right. Then, the volume of the hydraulic passage 20 increases and the oil pressure in the control bore 23 drops. Consequently, the poppet valve 30 closes the connection port 33 while the control member 29 of the control piston 24 is still pressing the poppet valve 30 (balanced condition). Thus, a particular air pressure is maintained (or confined) among the control chamber 27, air pipes 34 and 35, and air pressure inlet chamber 12b so that the piston plate 13 is held at a certain position and the clutch 8 is held at a desired half connected position.

When the hydraulic pressure is completely released, the hydraulic pressure in the control bore 23 further drops and the control piston 24 returns to the original position (leftmost position) as illustrated in FIG. 2. Then, the control member 29 leaves the poppet valve 30, and a release port 36 formed in the control member 29 communicates with the control chamber 27. As a result, part of the air pressure is introduced to an atmospheric pressure chamber 12a (opposite the air pressure inlet chamber 12b) from the release port 36 through an atmospheric pressure port 39. Therefore, the air pressure and spring force of the return spring 14 force the piston plate 13 to the left, thereby operating the clutch 8 to the connection direction B (FIG. 1). The remainder of the air pressure is discharged to the atmosphere from a breezer 37.

It should be noted that the breezer 37 has a check valve (not shown) for only expelling a gas so that the air pressure in the atmospheric pressure chamber 12a tends to become negative when the clutch is connected. This would result in insufficient connection of the clutch 8. In order to prevent the insufficient clutch connection, part of the air pressure is introduced to the atmospheric chamber 12a and the remainder is expelled to the outside from the breezer 37 in the illustrated embodiment.

A reference numeral 38 designates a seal for oil tightly sealing between the atmospheric pressure chamber 12a and hydraulic cylinder 22, 40 designates an atmospheric pressure port, and 41 designates a bleeder for air release when it is unscrewed.

In this manner, the control valve 7a controls feeding and discharging of air pressure to and from the booster 7 based on a signal oil pressure from the master cylinder 10 which operates in connection with a clutch pedal 9 (FIG. 1). Manual disconnection and connection of the clutch 8 is thusly performed.

Figure 3:
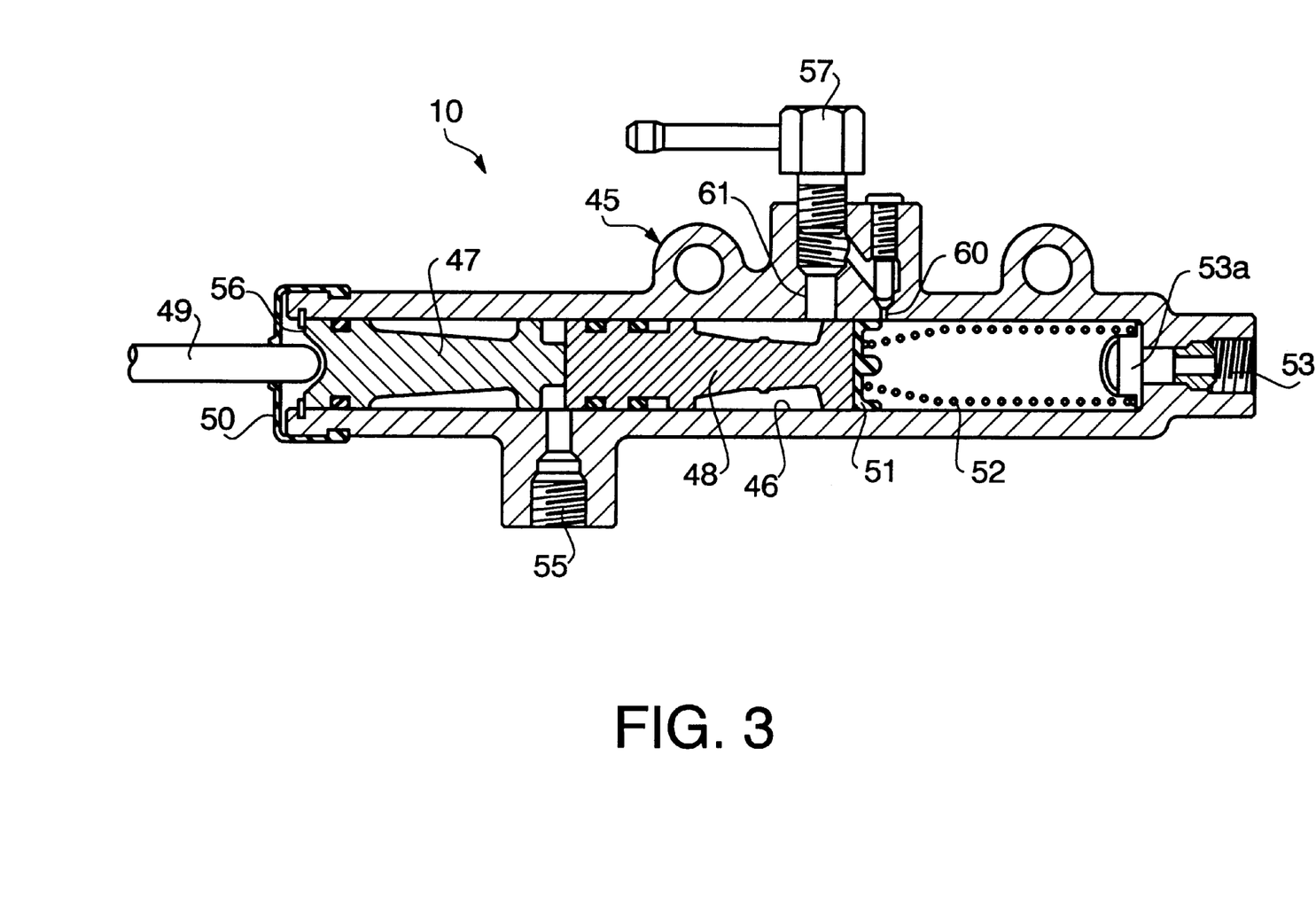
FIG. 3 illustrates an enlarged cross sectional view of a master cylinder shown in FIG. 1.

Referring now to FIG. 3, illustrated is a detail of the master cylinder 10 in elevational cross section. The master cylinder 10 includes a cylinder body 45 elongated in the width direction of the drawing (longitudinal direction of the master cylinder). Inside the cylinder body 45, formed is a cylinder bore 46 of a particular diameter. Two slidable pistons 47 and 48 are independently received in the cylinder bore 46. A free end of a push rod 49 extends into and retracts from a left opening of the cylinder bore 46 as a driver stamps and releases the clutch pedal 9. The left end of the cylinder bore 46 is closed by a dust boot 50. Near the other end (right end) of the cylinder bore 46, received is a return spring 52 that biases the first and second pistons 47 and 48 to the left via a piston cup 51. The right end of the cylinder bore 46 connects to an oil pressure feed port 53 formed at the right end of the cylinder body 45. The oil pipe 54 (FIG. 1) extends from the oil pressure feed port 53. A reference numeral 53a denotes a check valve.

In the illustrated condition, the clutch pedal 9 is not depressed by a driver's foot and the first and second pistons 47 and 48 are situated at their original positions respectively. An air pressure inlet port 55 is formed in the cylinder body 45 such that it extends between the first and second pistons 47 and 48. During a manual operation (when a driver stamps down the clutch pedal 9), both the first and second pistons 47 and 48 are caused to move in the master cylinder 10 to feed the oil pressure. During an automatic operation, on the other hand, an air pressure is supplied from the air pressure inlet port 55 so that the second piston 48 is only moved (will be described later). Movement of the first piston 47 is restricted by a snap ring 56. Since the first piston 47 does not move, the clutch pedal 9 does not move. A reference numeral 57 denotes an oil feed nipple which connects to an oil feed pipe 59 (FIG. 1) extending from a working oil reservoir tank 58 (FIG. 1), 60 a smaller diameter port which feeds an oil near the right side of the piston cup 51, and 61 a larger diameter port which feeds an oil toward the second piston 48.

As illustrated in FIG. 1, an air pressure feed pipe 62 extends from the air tank 5, and another air pressure feed pipe 67 extends from a branching point 63 of the air pipe 62. The air pipe 67 extends to the nipple 31 of the booster 7. The air pipe 62 extends to a shuttle valve 69. On the way to the shuttle valve 69, provided are two ON/OFF type three-way electromagnetic valves 78 and 79. The air pipe 62 includes an upstream pipe segment 62a which extends from the air tank 5 to the upstream three-way valve 78, an intermediate segment 62b which extends from the upstream three-way valve 78 to the downstream three-way valve 79 and a downstream segment 62c which extends from the downstream three-way valve 79 to the shuttle valve 69. An air pressure feed pipe 64 extends from a discharge port of the upstream three-way electromagnetic valve 78. A first air pressure discharge pipe 74 extends from the intermediate pipe segment 62b, and a second air pressure discharge pipe 68 extends from the downstream three-way electromagnetic valve 79.

The three-way valves 78 and 79 are operated (switched) based on an ON or OFF signal (control signal) from a controller 72. When the upstream three-way valve 78 is ON, it connects the upstream pipe segment 62a with the intermediate pipe segment 62b and closes the air pressure pipe 64. When OFF, the valve 78 connects the intermediate pipe segment 62b with the air pipe 64 and closes the upstream pipe segment 62a. When the downstream three-way valve 79 is ON, it connects the intermediate pipe segment 62b with the downstream pipe segment 62c and closes the air pipe 68. When it is OFF, it connects the downstream pipe segment 62c with the air pipe 62 and closes the intermediate pipe segment 62b.

The shuttle valve (double check valve) 69 is a mechanical three-way valve, and connects the air pipe 62 or 34 to the air pipe 35 based on an air pressure difference between the air pipes 62 and 34.

The air pipe 68 extending from the second three-way valve 79 connects to the breezer 37 of the booster 7. A downstream end of the air pipe 74 branched from the intermediate pipe segment 62b is connected to the air pipe 68. A downstream end of the air pipe 64 extending from the first three-way valve 78 is connected to the air pipe 68 at a position downstream of the air pipe 74.

The air pipe 74 has a first throttle (restriction or choke) 66 and check valve 75 in series. The check valve 75 is provided for allowing the air pressure to be transmitted in a particular one direction. The throttle 66 is relatively close to the intermediate pipe segment 62b and the check valve 75 is relatively close to the air pipe 68. When the air pressure is automatically discharged during automatic clutch connection, the air (air pressure) is caused to flow from the air pipe 68 to the air pipe 62b (will be described later). During air discharge, therefore, the throttle 66 is located downstream in terms of air flow direction and the check valve 75 is situated upstream. The check valve 75 only allows the air (air pressure) to move from the air pipe 68 to the air pipe 62b and forbids the opposite flow.

The air pipe 68 has a second throttle 76 between the air pipes 74 and 64. The second throttle 76 more throttles than the first throttle 66, i.e., it reduces a cross section of the air pipe more than the first throttle. When air pressure is discharged during automatic clutch connection, the air flows to the breezer 37 from the three-way electromagnetic valve 79 (will be described later). In terms of this air flow direction, the throttle 76 is downstream of the air pipe 74 merging in the air pipe 68.

The air pipes 62 and 35 which connect the air tank 5, the three-way valves 78 and 78, shuttle valve 69 and booster nipple 15 in turn constitute a first air pressure feed passage "a" to feed an air pressure to the booster 7 during automatic disconnection of the clutch 8 (will be described later).

The air pipes 62, 67, 34 and 35 which connect the air tank 5, branch point 63, control valve unit 7a, shuttle valve 69 and booster nipple 15 in turn constitute a second air pressure feed passage "b" to feed an air pressure to the booster 7 during manual disconnection of the clutch 8.

Another air pipe 70 extends from the intermediate pipe segment 62b and defines a third air pressure feed passage "c" to feed an air pressure to the master cylinder 10 when the clutch 8 is automatically disconnected.

This air pipe 70 extends to the air pressure inlet port 55 (FIG. 3) of the master cylinder 10 to supply the air pressure to the back of the second piston 48. A third three-way electromagnetic valve 80 is provided on the air pipe 70 for controlling air pressure feeding and discharging to and from the master cylinder 10. An air pipe 73 extends from a discharge side of the three-way valve 80 to the downstream pipe segment 62c. A check valve 43 is provided on the air pressure delivery pipe 73 for allowing the air (air pressure) to be transferred to the down-stream pipe segment 62c from the three-way valve 80 and forbidding the opposite flow. A spring action of the check valve 43 admits passage of the air (air pressure) when the air pressure on the left side (three-way valve 80 side) is greater than that on the right side (pipe segment 62c side).

The three-way valve 80 is ON/OFF controlled by the controller 72. When ON, the three-way valve 80 opens the air pipe 70 to connect the air tank 5 to the master cylinder 10 and closes the air pipe 73. When OFF, the three-way valve 80 connects a down-stream half of the air pipe 70 to the air pipe 73 and closes the upstream half of the air pipe 70. Accordingly, when the valve 80 is turned ON, it admits the air pressure feeding to the master cylinder 10, and when OFF, it discharges the air pressure from the master cylinder 10 to the air pipes 73 and 62. Thus, the downstream half of the air pipe 70 and air pipe 73 constitute an air pressure discharge passage for the master cylinder 10.

The clutch connection and disconnection apparatus 1 cooperates with a separate speed change mechanism (transmission) 71. The speed change mechanism 71 is an automatic transmission including a manual transmission and actuator. When a driver manually selects a shift position using a shift lever, it is electrically detected and a speed change signal is generated upon this detection. The speed change signal is then sent to the controller 72 and the actuator is operated based on this signal. The manual transmission is thusly operated (changed) to a desired position.

The clutch connection and disconnection apparatus 1 also includes an engine control means for controlling the diesel engine 91. The engine control means is the controller 72. The controller 72 determines an amount of fuel injection based on various signals sent from sensors, and outputs a control signal, which corresponds to the determined amount of fuel injection, to an electronic governor of a fuel injection pump 92. In the illustrated embodiment, an accelerator pedal stroke sensor 82 is provided on an accelerator pedal 75. The controller 72 determines an accelerator pedal position from an output signal of the sensor 82, and increases or decreases an engine revolution speed based on the determined accelerator pedal position. Specifically, the controller 72 normally uses an actual accelerator pedal position signal as an accelerate command signal (pseudo accelerator pedal position signal), and controls the engine based on this command signal. The controller 72, however, determines an accelerate command signal independent of the actual accelerator pedal position signal during automatic clutch disconnection and connection, and controls the engine according to the determined accelerate command signal only (will be described later).

The controller 72 receives signals from an idle switching 83, emergency/abnormality switch 84 provided near the shift lever of the transmission 71, a vehicle speed sensor 85 provided near an output shaft of the transmission 71, a pressure switch 86 attached to the air tank 5, a clutch pedal switch 87 provided on the clutch pedal 9, a clutch pedal stroke sensor 89 provided on the clutch pedal 9, and a clutch stroke sensor 88 provided on the clutch 8. An engine rotational speed sensor 93 and clutch rotational speed sensor 94 are also connected to the controller 72. The engine rotational speed sensor 93 is provided on an output shaft of the engine 91 or an input shaft of the clutch 8, and the clutch rotational speed sensor 94 is provided on an output shaft of the clutch 8 or an input shaft of the transmission. These sensors 93 and 94 detect input and output revolution speeds of the clutch 8 respectively. It should be noted that the controller 72 may be comprised of a plurality of controllers such as ECU and CPU which may control the clutch, transmission and engine separately.

Figure 4:
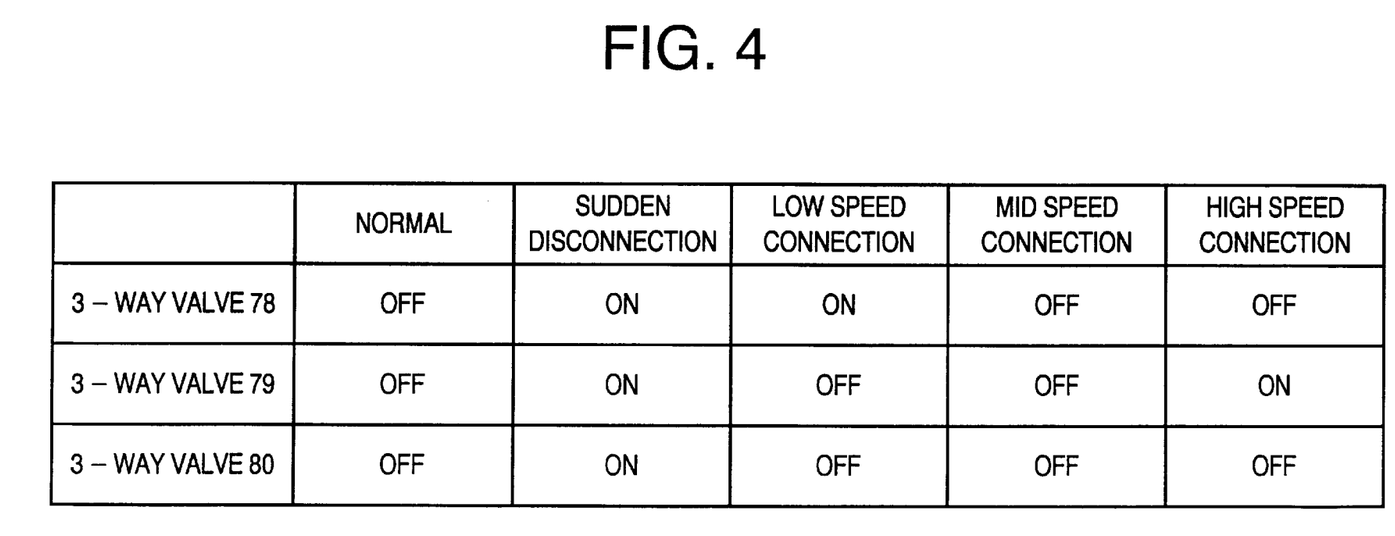
FIG. 4 illustrates excitation patterns for three three-way electromagnetic valves in accordance with clutch modes.

Now, operation of the clutch connection and disconnection apparatus will be described. FIG. 4 illustrates electricity application patterns (ON/OFF patterns) to the electromagnetic valves 78, 79 and 80 depending upon various clutch modes. In the diagram of FIG. 4, "NORMAL" means a manual operation. All the electromagnetic valves 78, 79 and 80 are turned off when NORMAL.

First, a manual disconnecting operation to the clutch 8 will be described. When a driver depresses the clutch pedal 9 by his or her foot, an oil pressure is supplied from the master cylinder 10. This oil pressure operates the control valve unit 7a to connect the air pressure pipes 67 and 34 with each other. As a result, the air pressure of the air pipe 34 switches the shuttle valve 69 and enters the air pipe 35 and in turn the air pressure inlet chamber 12b of the booster 7. Then, the piston plate 13 is moved and the clutch 8 is disconnected. The clutch 8 is moved in the disconnecting direction a desired amount based on the movement of the clutch pedal 9. The controller 72 knows that this is a manual operation from a signal (ON signal) sent from the clutch pedal switch 87, and maintains all the three-way electromagnetic valves 78 to 80 off.

On the other hand, when the clutch 8 is connected by a manual operation, the oil pressure is drawn out in accordance with a clutch pedal release operation of the driver. Consequently, the control valve unit 7a connects the air pipe 34 to the atmospheric pressure port 39. Then, the air pressure in the air pressure inlet chamber 12b is introduced to the atmospheric pressure chamber 12a via the pipes 35 and 34. As a result, connection of the clutch 8 is completed. During this manual connection, the controller 72 also maintains the three three-way valves 78 to 80 off since the clutch pedal switch 87 is still on.

As understood from the above, the control valve unit 7a functions like a three-way valve which connects the air pipe 34 to either the air pipe 67 or the atmospheric pressure port 39 upon receiving an oil pressure signal (pilot oil pressure) from the master cylinder 10. The air pressure feed means 2, second air pressure feed passage "b", booster 7, control valve unit 7a, master cylinder 10 and oil pressure pipes 54 and 20 constitute in combination a manual disconnection and connection means for carrying out clutch manual disconnection and connection according to the clutch pedal operation.

Next, an automatic disconnection and connection of the clutch 8 will be described. First, an outline of this operation will briefly be described including a general idea of automatic speed changing.

When a driver moves a shift lever, a speed change signal is input to the controller 72. Based on this signal, the controller 72 turns the three-way electromagnetic valves 78 and 80 on, and subsequentially turns the electromagnetic valve 79 on. Then, an air pressure is relatively quickly (within a short period) supplied to the air pressure inlet chamber 12b of the booster 7 from the first air pressure feed passage "a". Accordingly, the clutch 8 is immediately disconnected (sudden disconnection of the clutch). After that, the speed change operation of the transmission 71 is completed by an actuator (not shown), and for instance the three-way electromagnetic valves 78 and 80 are turned off and the electromagnetic valve 79 is maintained on to introduce part of the air pressure of the air pressure inlet chamber 12b into the atmospheric pressure chamber 12a and discharge the remainder from the breezer 37 thereby connecting the clutch 8 at a relatively high speed (clutch high speed connection) and completing the speed change (shift position change).

The air pressure feed means 2, first air pressure feed passage "a", booster 7, three-way electromagnetic valves 78 and 79, air pressure discharge passage (air pipes 35, 62, 64, 68 and 74) and controller 72 constitute in combination an automatic clutch disconnection and connection means for the clutch 8 upon receiving a predetermined signal (will be described later).

As may be understood from FIG. 2, there is a possibility that movement of the hydraulic piston 17 to the right may increase the volume of the hydraulic cylinder 22 filled with the working oil when the clutch 8 is automatically disconnected. This would generate a negative pressure in the oil pressure pipe 20 and oil pressure delivery pipe 54 (collectively referred to as "oil pressure passage") and bubbles in the working oil. In the clutch connection and disconnection apparatus 1, therefore, the three-way electromagnetic valves 78 and 80 are turned on to feed the air pressure into the master cylinder 10 through the air pipes 62 and 70 when the clutch 8 is automatically disconnected. This moves the second piston 48 and applies a pressure to the oil pressure passage appropriately. As a result, the pressure in the oil pressure passage would not become negative. A sufficiently high pressure is promptly supplied to the master cylinder 10 since no check valve or the like is provided on its way. If there were a check valve, a pressure difference would arise across the check valve. In such a case, delay in oil pressure rising and shortage in oil feeding would result. The illustrated embodiment eliminates such possibility.

Particularly in the clutch connection and disconnection apparatus 1, the air pressure delivery pipe 70 is connected to the air pressure delivery pipe 62 between the three-way electromagnetic valves 78 and 79 so that it is possible to delay the air pressure feeding to the booster 7 relative to that to the master cylinder 10. In other words, when the clutch 8 is automatically disconnected, the three-way electromagnetic valves 78 and 80 are first turned on, and then the last three-way electromagnetic valve 79 is turned on after a predetermined period (e.g., 50 ms). This allows a sufficient oil pressure to generate from the master cylinder 10 (i.e., pre-pressurizing) before starting the operation of the booster 7 (i.e., movement of the piston plate 13). Accordingly, oil pressure generation by the master cylinder 10 is accelerated and negative pressure generation in the oil pressure passage is avoided completely. It should be noted that oil pressure generation tends to be slow when extremely cold (e.g., −20° C. or below). Therefore, the above described construction is particularly advantageous.

During automatic clutch connection, the apparatus admits three choices in clutch connection speed based on combination of ON and OFF of the three-way electromagnetic valves 78 and 79 as understood from FIG. 4. Specifically, when the valve 78 is OFF but the valve 79 is ON, the air pressure in the air pressure inlet chamber 12b of the booster 7 is transmitted to the air pipe 35, shuttle valve 69, downstream pipe segment 62c, three-way electromagnetic valve 79, intermediate pipe segment 62b, three-way electromagnetic valve 78, air pipe 64, air pipe 68 and breezer 37 in turn. There is no throttle on the way so that the air pressure transmission is prompt, and the air pressure entering the air pipe 74 from the intermediate pipe segment 62b is restrained by the check valve 75. Most of the air pressure which has reached the breezer 37 is introduced to the atmospheric pressure chamber 12a of the booster 7. Therefore, the piston plate 13 of the booster 7 relatively quickly returns to the original position by the biasing force of the return spring 14 and another return spring (not shown) of the clutch 8 and the air pressure. The clutch 8 is thus connected at a relatively high speed (high speed connection of the clutch). A surplus air pressure is expelled to the atmosphere from the breezer 37.

When both the three-way electromagnetic valves 78 and 79 are off, the air pressure discharged from the booster 7 is mainly transferred to the air pipe 35, shuttle valve 69, downstream pipe segment 62c, three-way electromagnetic valve 79, air pipe 68, air pipe 74, intermediate pipe segment 62b, three-way electromagnetic valve 78, air pipe 64, air pipe 68 and breezer 37 in turn. The air in the air pipe 74 causes the check valve 75 to open, and this air passes through the throttle 66. Since the throttling of the throttle 66 is relatively small (relatively large cross section), the air is only decelerated to a certain extent. The air in the air pipe 68 does not flow into the branch pipe 74 entirely but partly flows into the throttle 76. Since the throttling of the throttle 76 is relatively large (smaller cross section), the speed of air after this throttle is slower than that having passed the throttle 66. The air flowing through the throttle 76 merges in the air flowing through the air pipe 64 so that the air discharge speed of the booster 7 becomes substantially equal to a value which is obtained where an air would flow through a throttle having a summed up cross sectional area of the throttles 76 and 66. In this manner, the air having an intermediate speed reaches the breezer 37. The return speed of the piston plate 13 is also intermediate and the connection speed of the clutch 8 is intermediate as well (intermediate speed connection of the clutch).

When the three-way electromagnetic valve 78 is on and the three-way electromagnetic valve 79 is off, the air pressure discharged from the booster 7 is transferred to the air pipe 35, shuttle valve 69, downstream pipe segment 62c, three-way electromagnetic valve 79, air pipe 68 and breezer 37. Although some air tends to branch to the air pipe 74 from the air pipe 68 (reverse flow), this flow of air is restrained by the check valve 75. Specifically, since the three-way electromagnetic valve 78 is on, the air pressure of the air tank 5 is transmitted to the upstream pipe segment 62a, three-way electromagnetic valve 78, intermediate pipe segment 62b and air pipe 74. This air pressure holds the check valve 75 in a closed condition, and therefore the branching air flow toward the air pipe 74 (reverse flow) is restricted. On the other hand, since the air pipe 68 has a large throttle 76, the air in the air pipe 68 is considerably decelerated by the throttle 76 and reaches the breezer 37. After all, the air discharge speed of the booster is determined by the throttle 76. The air of low speed flows to the breezer 37. Both the return speed of piston plate 13 and the connection speed of the clutch are slow (slow speed connection of the clutch).

Therefore, combination of the two three-way electromagnetic valves 78 and 79 provides three kinds of clutch connection speed (fast, intermediate and slow). In particular, this allows a driver to select one of two sluggish connecting speeds, i.e., the intermediate or low speed, and increases freedom of control. Thus, it is possible to select the best clutch connection speed in any driving modes. Selection of the most appropriate clutch connection speed according to a driving mode results in reduction of shock during clutch connection. A driver can still operate a vehicle comfortably even after a friction clutch wears considerably. Tuning also becomes easier.

There are four possible combinations when two electromagnetic valves are used (ON-ON, ON-OFF, OFF-ON and OFF-OFF). The clutch connection and disconnection apparatus 1 takes advantage of all of these combinations. Therefore, it is feasible not to increase the number of electromagnetic valves and associated costs greatly or unnecessarily. In addition, the number of output ports of the controller 72 is small and installation space for the electromagnetic valves is small in the invention. This contributes to reduction of chance of failure and improvement of reliability. Since the air pressure circuit is only modified, the cost and space are not increased.

Practically, there is no flow of air directed to the air pipe 70 from the intermediate pipe segment 62b during automatic connection of the clutch 8. This is because the three-way electromagnetic valve 80 is turned off when the electromagnetic valves 78 and 79 are switched. When the electromagnetic valve 80 is turned off, movement of the air pressure toward the master cylinder 10 is prohibited. At the same time, the master cylinder 10 discharges the air pressure. This air pressure flows to the air pipe 73, check valve 43 and downstream pipe segment 62c. In the downstream pipe segment 62c, the air pressure merges into the air pressure discharged from the booster 7. After confluence, the combined air pressure is directed toward the three-way valve 79 and discharged through the same route(s) as described above.

Thus, the air pressure expelled from the master cylinder 10 (master cylinder discharge pressure) can substantially be equalized to the air pressure expelled from the booster 7 (booster discharge pressure). In other words, these two flows of air are discharged similarly. In particular, the check valve 43 can always maintain the master cylinder discharge pressure to be higher than the booster discharge pressure and always cause the air pressure discharge from the master cylinder 10 to delay relative to the air pressure discharge from the booster 7. Therefore, the second piston 48 of the master cylinder 10 can always be brought into a pressed condition during clutch connection without special adjustments for adapting the air pressure discharge speeds to each other. Thus, it is possible to completely prevent the pressure in the oil pressure passage from becoming negative.

The clutch connection and disconnection apparatus 1 has another advantage: the two three-way electromagnetic valves 78 and 79 are provided in series on the air pipe 62. If the upstream three-way electromagnetic valve 78 is accidentally kept on due to a trouble such as short circuit, the downstream three-way electromagnetic valve 79 is turned off. This interrupts the air pressure from the upstream electromagnetic valve 78 and discharges the air pressure from the booster 7. Therefore, the clutch 8 is automatically connected. After that, a driver can manually disconnect and connect the clutch.

If the downstream electromagnetic valve 79 is continuously turned on due to a trouble such as short circuit, the upstream electromagnetic valve 78 is then turned off. This results in interruption of the air pressure from the air tank 5 and discharge of the air pressure from the booster 7 through the air pipes 64 and 68. Thus, the clutch 8 can automatically be connected. Subsequent to this, it is possible to manually disconnect and connect the clutch 8. As the air is discharged from the booster 7, the third electromagnetic valve 80 is turned off to discharge the air from the master cylinder.

Since the electromagnetic valves 78 and 79 are provided in tandem, it is feasible to stop the air pressure feeding by one of the valves and discharge the air pressure even if one of them is out of order. Upon discharging the air pressure, the clutch 8 can be brought into the connecting condition. Then, a driver can manually disconnect and connect the clutch. This is a complete failsafe operation. The vehicle can continuously move, and reliability of the clutch connection and disconnection apparatus 1 is improved. In particular, these two valves are both three-way electromagnetic valves so that switching between the air discharge lines (air pipes 64 and 68) is possible. This is advantageous if compared with two-way electromagnetic valves. Therefore, it is unnecessary to increase the number of electromagnetic valves in vain. The above-mentioned two electromagnetic valves are sufficient to insure the failsafe operation, air discharge speed switching (clutch connection speed switching) and air pressure introduction/discharge of the master cylinder 10. This is particularly advantageous in cost. If the third three-way electromagnetic valve 80 is unintentionally kept on, the first three-way electromagnetic valve 78 is turned off.

Various changes and modifications may be made to the above described construction. For example, the locations of the throttle 66 and check valves 75 may be reversed. The throttle 76 may be completely closed so that clutch is maintained in a disconnected condition instead of slowly connecting the clutch.

Now, major features of the clutch connection and disconnection apparatus 1 will be described.

Referring to FIGS. 5A to 5D, illustrated are graphs of the operating condition of the apparatus 1 during automatic speed change (shift change). The horizontal axes all indicate the time.

Figure 5A:
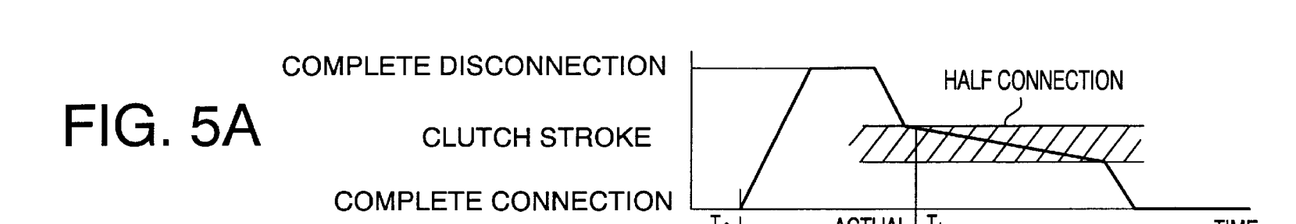
FIG. 5A illustrates a changing clutch condition according to a clutch pedal stroke.
Figures 5B, 5C:
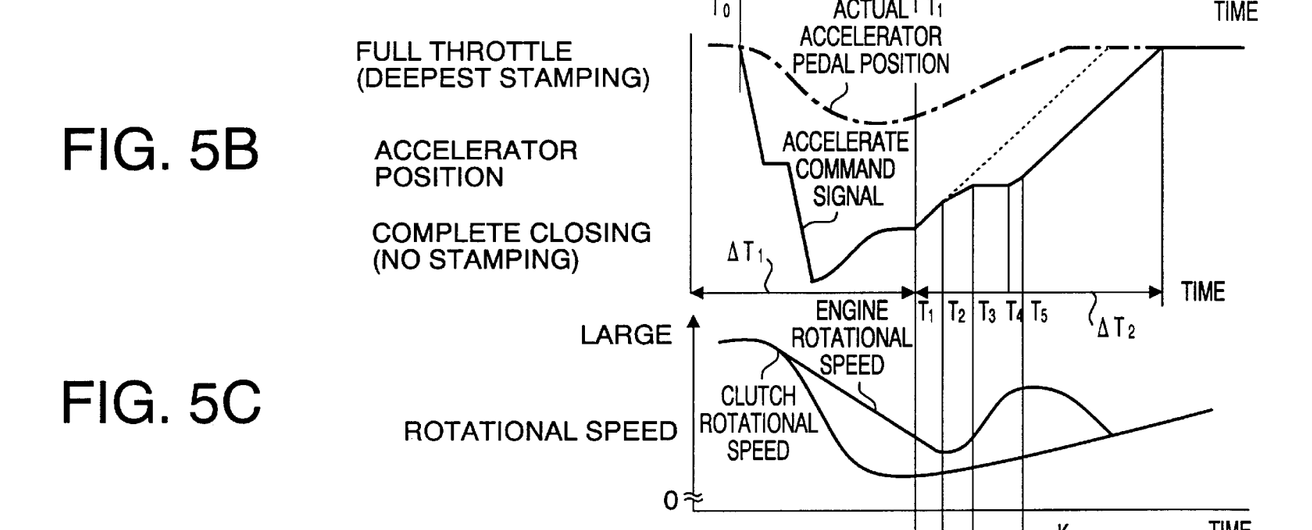
FIG. 5B illustrates a relationship between an actual accelerator pedal position signal and accelerate command signal.
FIG. 5C illustrates a relationship between an engine rotational speed and clutch rotational speed.
Figure 5D:
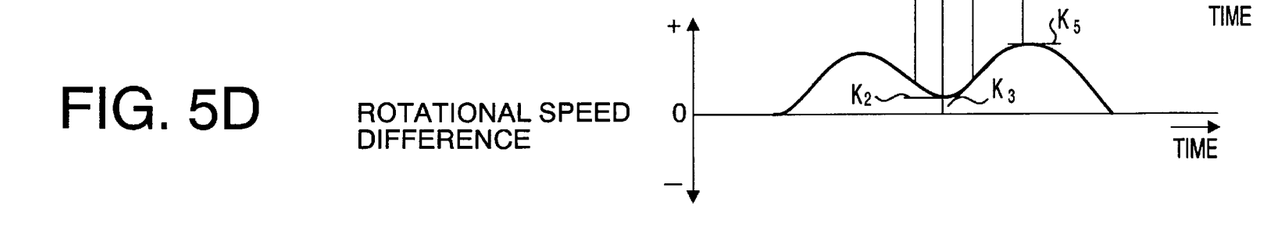
FIG. 5D illustrates an engine-clutch rotational speed difference.

FIG. 5A depicts a clutch stroke detected by the clutch stroke sensor 88, i.e., the connecting condition of the clutch 8, FIG. 5B depicts an actual accelerator pedal position detected by the accelerator pedal stroke sensor 82 and an accelerate command signal determined by the controller 72, FIG. 5C illustrates relationship between the engine rotational speed and clutch rotational speed, and FIG. 5D illustrates a rotational speed difference between the engine and clutch.

As understood from FIG. 5A, the clutch disconnection is initiated when a shift change (speed change) signal is input (T0). The clutch 8 is maintained in a disconnected condition while the transmission 71 is operating for shift change. After the transmission 71 completes the shift change, the clutch connection proceeds at a fast speed, slow or mid speed, and fast speed in turn in a stepwise manner. The first fast speed clutch connection is carried out based on a signal (indicative of completion of shift change) sent from the transmission 71. When an output value of the clutch stroke sensor 88 becomes a particular value which corresponds to a point slightly before a starting point of clutch half connection (just before entering the shaded area), the controller 72 switches the three-way electromagnetic valves 78 and 79 to change the clutch connection speed from the high speed to the low or mid speed. The controller 72 determines and stores the start of half connected condition of clutch 8 (shaded area) in RAM beforehand by its self learning function.

Referring to FIG. 5B, the accelerate command signal steeply drops upon inputting of the shift change signal (T0) so that racing of the engine 91 is prevented during clutch disconnection. After the transmission 71 completes the shift change (gear disengagement, synchronizer synchronization and gear engagement), the accelerate command signal is increased to approach the actual accelerator pedal position signal. Specifically, in a particular range of a period ΔT1 (until the clutch 8 enters the half connected condition), the accelerate command signal is raised. During the next period ΔT2 (while the clutch 8 is in the half connected condition), the controller also causes the accelerate command signal to approach the actual accelerator pedal position signal and eventually the accelerator command signal reaches the actual accelerator pedal position signal.

The driver knows that the engine revolution speed is automatically controlled during automatic shift change. Therefore, releasing and stamping down of the accelerator pedal 75 by the driver's foot during the shift change operation is probably less than where the driver operates a common manual vehicle. Accordingly, it is assumed that the actual accelerator pedal position signal is larger than the accelerate command signal. On the other hand, the timing of accelerator pedal releasing and stamping down is almost the same as a common manual vehicle so that the driver is believed to stamp down the accelerator pedal 75 during clutch connection.

After the clutch 8 enters the half connected condition at T1, the accelerate command signal is determined in the following manner. The controller 72 calculates a rotational speed difference $\Delta N$ between the engine rotational speed Ne and clutch rotation speed Nc and a differential value S of the rotational speed difference $\Delta N$. The rotational speed difference $\Delta N$ is obtained by the equation of $\Delta N = Ne - Nc$, and the differential value S is obtained by the equation of $S = \Delta N_n - \Delta N_{n-1}$.

Figure 6A:
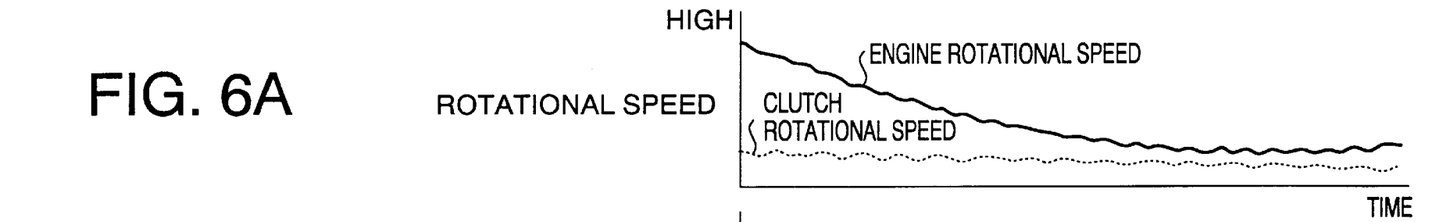
FIG. 6A illustrates a relationship between an engine rotational speed and clutch rotational speed.
Figure 6B:
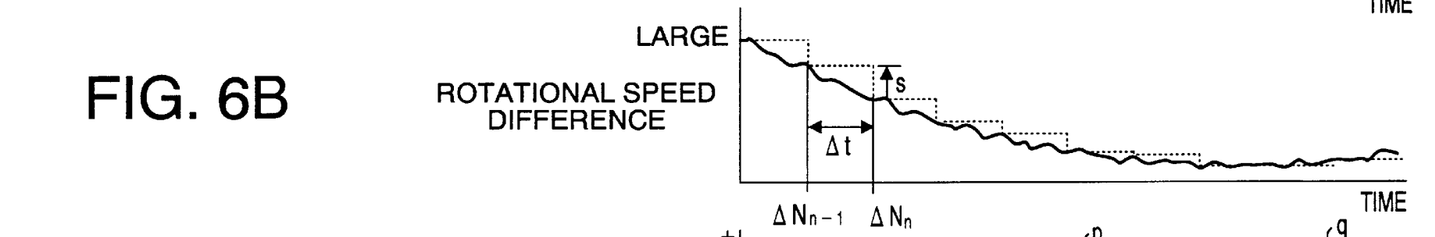
FIG. 6B illustrates an engine-clutch rotational speed difference.
Figure 6C:
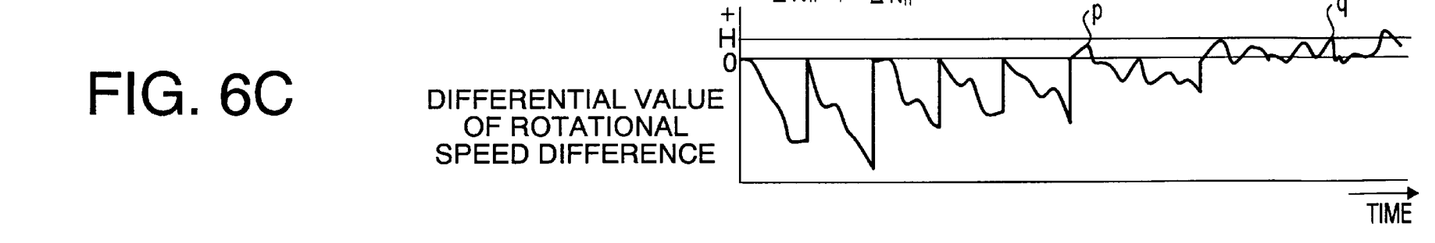
FIG. 6C illustrates a change of the engine-clutch rotational speed difference.

As best understood from FIG. 6B, the differential value S is obtained by subtracting a rotational speed difference at a particular period ($\Delta t$, e.g., 50 ms) before a current time $\Delta N_{n-1}$ from a rotation speed difference at a current time $\Delta N_n$. When S<0, it is determined that the clutch is in a synchronization mode. When $0 \leq S \leq H$ (H is a threshold value), it is then determined that there is small clutch slippage. When H<S, the clutch is determined to slip greatly. As illustrated in FIG. 6C, the rotational speed change is positive (+) at the point "p" but S<H and the point "p" is not on a differential value calculation point. Actually, a substantial part of the curve near the point "p" is drawn below the 0 (zero) line or the point "p" temporarily exceeds the zero line so that determination based on the point "p" is not appropriate. Therefore, it is not determined that the clutch 8 slips in a large amount. The point "q" satisfies these two criteria so that it is determined that there is a large slippage in the clutch 8.

The slipping of the clutch is determined as described above so that the controller 72 of the apparatus 1 stores two threshold values (first threshold H1 and second threshold H2: $0<H1<H2$) beforehand. Specifically, the apparatus 1 makes determination in the following manner.

(1) When $S \leq H1$, it is determined that the clutch is slipping appropriately. The accelerate command signal is increased at a constant rate such that it approaches the actual accelerator pedal position signal. The approaching speed of the accelerate command signal to the actual accelerator pedal position signal is positive (+) and referred to as "first speed".

(2) When $H1 < S \leq H2$, it is determined that the clutch is slipping a little too much. Then, the accelerate command signal is controlled such that a difference between the actual accelerator pedal position signal and itself is maintained to be constant. The approaching speed of the accelerate command signal to the actual accelerator pedal position signal is zero and referred to as "second speed".

(3) When $H2 < S$, it is determined that the clutch is slipping excessively. Then, the accelerate command signal is maintained at a current value. The approaching speed of the accelerate command signal to the actual accelerator pedal position signal is negative and referred to as "third speed".

Figure 7:
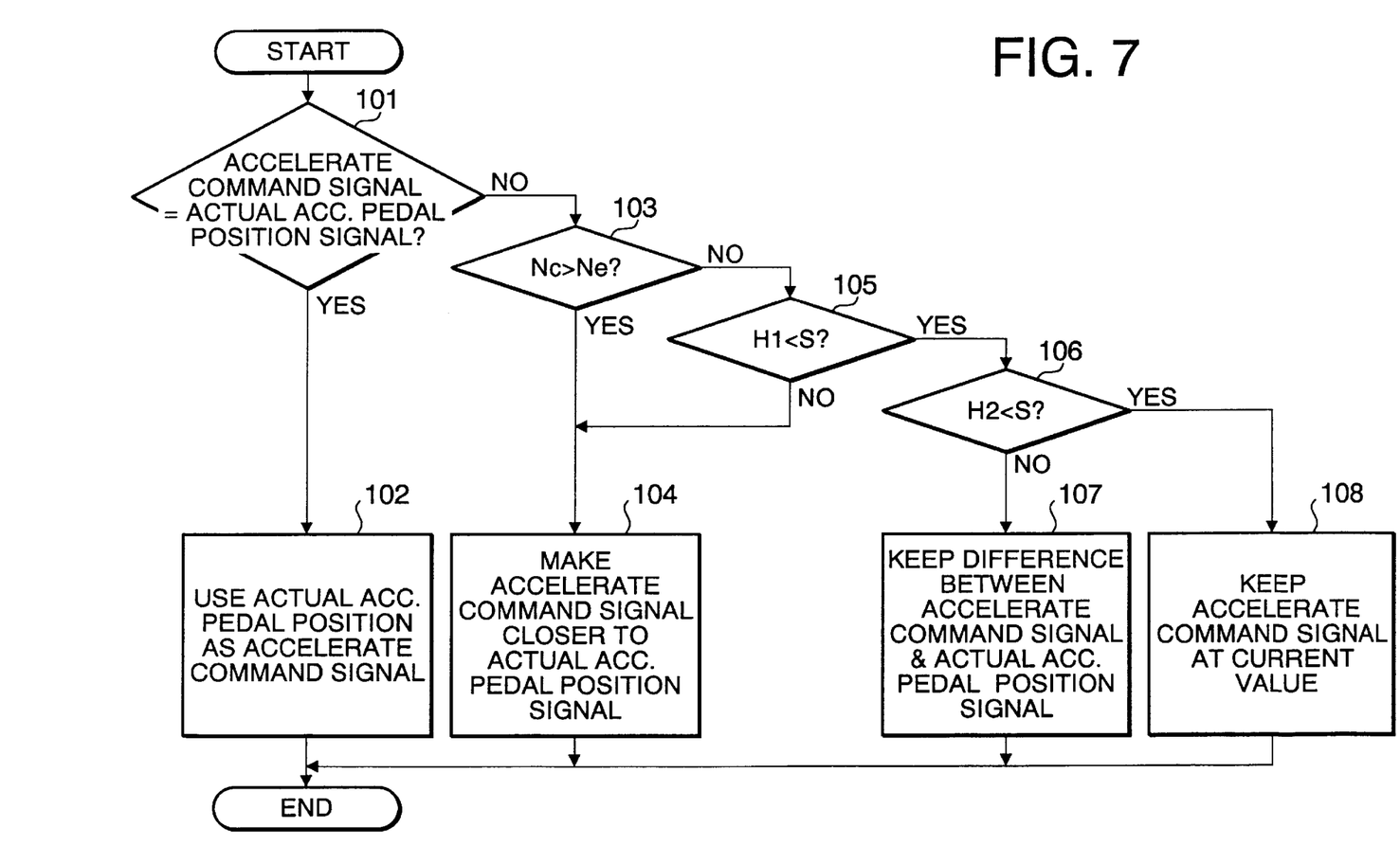
FIG. 7 illustrates a flowchart of control according to the present invention.

The above three ways of control will be described in reference to a flowchart shown in FIG. 7.

The controller 72 determines whether the actual accelerator pedal position signal is equal to the accelerate command signal at step 101. If YES, it means that a vehicle is in a normal driving condition. Thus, the program proceeds to step 102 and the actual accelerator pedal position signal is used as the accelerate command signal. If the answer at step 101 is NO, it means that the engine control as described above is in progress, and the program proceeds to step 103 to compare the engine revolution speed with the clutch revolution speed. If the clutch revolution speed is higher than the engine revolution speed (Nc>Ne), the program advances to step 104 to perform the control (1): the accelerate command signal is increased at a constant speed to become closer to the actual accelerator pedal position signal. Thus, the engine rotational speed approaches the clutch rotational speed.

When the clutch revolution speed $\leq$ the engine revolution speed, it is necessary to determine the slipping degree of the clutch 8. The program therefore advances to step 105 to compare the differential value S with the first threshold value H1. If $S \leq H1$, the program goes to step 104 to perform the control (1).

If H1<S, the program goes to step 106 to compare the differential value S with the second threshold value H2. If $S \leq H2$, the program proceeds to step 107 to execute the control (2): the difference between the actual accelerator pedal position signal and accelerate command signal is maintained unchanged.

If H2<S, the program proceeds to step 108 to execute the control (3): the accelerate command signal is held.

FIGS. 5A to 5D illustrate all the controls (1) to (3). Specifically, immediately after the clutch 8 enters the half connected condition (immediately after T1), the control (1) is carried out so that the accelerate command signal is raised at a certain rate. If this control continued, the accelerate command signal would eventually reach the actual accelerator pedal position signal as indicated by the broken line in FIG. 5B. In the illustrated embodiment, however, the differential value S exceeds the thirst threshold H1 at the time T2 so that the control (2) is executed after the time T2 thereby reducing the increasing speed of the accelerate command signal (approaching speed). As a result, the engine rotational speed rises slowly to restrict clutch slippage. It should be noted that the differential value S at the time T2 is indicated by K2 in FIG. 5D.

Here, the clutch slippage still increases during the control (2), and the differential value S exceeds the second threshold value H2 at the time T3. Accordingly, the control (3) is then executed. The accelerate command signal is now maintained at a current value to further reduce the increasing speed of the accelerate command signal (approaching speed) and the rising speed of the engine rotational speed. The slipping of the clutch is therefore further restrained. The differential value S at the time T3 is represented by K3 in FIG. 5D.

During the control (1) to (3) from the time T1, the clutch connection proceeds at a constant speed (low or intermediate speed). Therefore, the engine rotational speed eventually becomes close to the clutch rotational speed if the accelerate command signal is controlled in the above described manner. When the differential value S becomes smaller than the second threshold value H2 (time T4), the control (2) is carried out. When the differential value S drops below the first threshold value H1 (time T5), the control (1) is carried out. Eventually, the clutch 8 is connected completely, and the accelerate command signal catches up (returns to) the actual accelerator pedal position signal. The differential value S at the time T5 is indicated by K5 in FIG. 5D (K5=K2).

In this manner, the approaching speed of the accelerate command signal is stepwise varied according to comparison between the differential value S and the threshold value H1/H2. This prevents excessive slippage of the clutch 8 when the clutch is automatically connected, and makes it possible to connect the clutch with appropriate slippage like a manually operated clutch. Therefore, the driver does not feel unnaturalness when the shift position is automatically changed, and the vehicle smoothly accelerates.

Although the illustrated embodiment deals with an example where the clutch connection speed is maintained at a low or intermediate speed in the half connected condition, the present invention is not limited to this. For instance, if the clutch slippage becomes more excessive, the clutch connection speed may be changed to an intermediate speed from a low speed or to a high speed from an intermediate speed. In this case, third and fourth threshold values H3 and H4 (H2<H3<H4) may be prepared. The control (3) may be performed when H2≦S<H3. When H3≦S<H4, the clutch connection speed may be shifted to an intermediate speed from a low speed. When H4<S, the connection speed may be shifted to a high speed from an intermediate speed. The threshold values H3 and H4 which are greater than the threshold values H1 and H2 are utilized to shift the connection speed because adjusting the clutch connection speed is more effective in clutch slippage regulation than controlling the engine and frequently changing the clutch connection speed using the smaller threshold values would result in frequent on/off switching of the electromagnetic valves 78 and 79. The latter is disadvantageous in terms of reliability and longevity.

As seen in FIG. 5C, the above described embodiment deals with an example where the engine rotational speed is faster than the clutch rotational speed. If the clutch rotational speed is faster than the engine rotational speed, the control (1) is executed without performing comparison between the rotational speed difference S and the threshold values H1 and H2 as understood from step 103 of the flowchart shown in FIG. 7. In other words, the accelerate command signal approaches the actual accelerator pedal position signal at a relatively high constant speed.

By doing so, the engine rotational speed promptly matches to the clutch rotational speed and it is therefore possible to reduce a time for clutch synchronization. In this case, over-slipping of the clutch may hardly occur even if the accelerate command signal is raised. If the control (2) and/or (3) is selected to delay the approaching speed, the clutch synchronization speed becomes slow and the clutch over-slips. Therefore, the control (1) is selected to employ the first speed, which reduces the clutch synchronization period as well as clutch wear.

The present invention is not limited to the foregoing embodiment. For example, the number of threshold values may be increased to change the approaching speed more frequently. Further, the three ways of control (1), (2) and (3) are not necessarily carried out. For instance, the accelerate command signal may be increased like a curve of the second order instead of the control (1), the accelerate command signal may be determined such that the difference between the actual accelerator pedal position signal and accelerate command signal gradually increases or decreases instead of the control (2), and the accelerate command signal may gradually decrease instead of the control (3). Teaching of the present invention is applicable to an engine having a mechanical governor. The governor may be operated by a motor or actuator such as a hydraulic or pneumatic cylinder when the engine is controlled. In addition, a method of detecting the accelerator pedal position is not limited to the illustrated one which uses the accelerator pedal stroke sensor 82 for sensing a pivot movement of the accelerator pedal 75. For example, movement of a linkage operatively associated with the accelerator pedal may be detected instead of directly detecting the movement of the accelerator pedal. The present invention is also applicable to a full automatic clutch system which does not have a manual clutch disconnection and connection means.

The clutch connection and disconnection apparatus described above is disclosed in Japanese Patent Application No. 9-248862 filed with JPO on Sep. 12, 1997 and the entire disclosure thereof is incorporated herein by reference.

What is claimed is:

1. A clutch connection and disconnection apparatus used for a vehicle having an engine, a clutch and an accelerator pedal, comprising:
    an automatic clutch disconnection and connection means for automatically disconnecting and connecting a clutch upon receiving a predetermined signal; and
    an engine control means for controlling an engine of a vehicle according to an accelerate command signal which is different from an actual accelerator pedal position signal when clutch automatic disconnection and connection is performed, and
    wherein the accelerate command signal is regulated to become close to the actual accelerator pedal position signal when clutch automatic connection is performed, and an approaching speed of the accelerate command signal to the actual accelerator pedal position signal is changed stepwise based on comparison of a differential value of rotational speed difference between an engine rotational speed and clutch rotational speed with a threshold value.

2. The clutch connection and disconnection apparatus of claim 1, wherein the threshold value includes a first threshold value and a second threshold value greater than the first threshold value, and the engine control means sets the approaching speed to a first speed when the differential value is not greater than the first threshold value, sets the approaching speed to a second speed slower than the first speed when the differential value is greater than the first threshold value but not greater than the second threshold value, and sets the approaching speed to a third speed slower than the second speed when the differential value is greater than the second threshold value.

3. The clutch connection and disconnection apparatus of claim 2, wherein the second speed is obtained by maintaining a difference between the actual accelerator pedal position signal and accelerate command signal, and the third speed is obtained by maintaining the accelerate command signal at a constant value.

4. The clutch connection and disconnection apparatus of claim 2, wherein the engine control means does not compare the differential value with the threshold value and maintains the approaching speed at a particular value when the engine rotational speed is smaller than the clutch rotational speed during clutch automatic connection.

5. The clutch connection and disconnection apparatus of claim 1, wherein the engine control means changes the approaching speed while the clutch is in a half connected condition during clutch automatic connection.

6. The clutch connection and disconnection apparatus of claim 2, wherein the clutch automatic disconnection and connection means raises a clutch connection speed when the differential value is greater than a third threshold value that is greater than the second threshold value.

7. The clutch connection and disconnection apparatus of claim 1, wherein the engine is a diesel engine and the control means controls an electronic governor of the diesel engine.

8. The clutch connection and disconnection apparatus of claim 1, wherein the predetermined signal is a shift change signal generated upon operating a shift lever, and the automatic clutch disconnection and connection means starts clutch automatic disconnection based on this signal.

9. The clutch connection and disconnection apparatus of claim 1, wherein the automatic clutch disconnection and connection means includes a booster for disconnecting and connecting a clutch according to air pressure introduction and discharge, a three-way electromagnetic valve for switching between the air pressure introduction and discharge of the booster, and a controller for controlling a switching operation of the three-way electromagnetic valve.

10. The clutch connection and disconnection apparatus of claim 9, wherein the automatic clutch disconnection and connection means includes a plurality of three-way electromagnetic valves equipped with different restrictions at their outlets respectively, and the controller uses the plurality of three-way electromagnetic valves so that a speed of air pressure discharge from the booster is stepwise adjustable and a clutch connection speed is also stepwise adjustable.

11. The clutch connection and disconnection apparatus of claim 1 further including manual clutch disconnection and connection means for allowing a vehicle driver to disconnect and connect a clutch as a vehicle driver operates a clutch pedal.

12. The clutch connection and disconnection apparatus of claim 11, wherein the manual clutch disconnection and connection means includes a booster for disconnecting and connecting a clutch according to air pressure introduction and discharge, a hydraulic valve for switching between the air pressure introduction and discharge of the booster, and a master cylinder for generating an oil pressure according to movement of a clutch pedal to operate the hydraulic valve.

* * * * *